US006893609B2

United States Patent
Matsuzaki et al.

(10) Patent No.: US 6,893,609 B2
(45) Date of Patent: May 17, 2005

(54) BEARING MATERIAL

(75) Inventors: Akihiro Matsuzaki, Kurashiki (JP);
Takashi Iwamoto, Kurashiki (JP);
Yoshio Yamazaki, Handa (JP);
Katsuhiko Kizawa, Osaka (JP); Masao Goto, Osaka (JP)

(73) Assignee: JFE Steel Corporation (JP)

( * ) Notice: Subject to any disclaimer, the term of this patent is extended or adjusted under 35 U.S.C. 154(b) by 94 days.

(21) Appl. No.: 10/240,297

(22) PCT Filed: Jan. 24, 2002

(86) PCT No.: PCT/JP02/00493

§ 371 (c)(1),
(2), (4) Date: Sep. 30, 2002

(87) PCT Pub. No.: WO02/059390

PCT Pub. Date: Aug. 1, 2002

(65) Prior Publication Data

US 2003/0136474 A1 Jul. 24, 2003

(30) Foreign Application Priority Data

Jan. 26, 2001 (JP) ........................................ 2001-18884

(51) Int. Cl.$^7$ ........................... C22C 38/02; C22C 38/18
(52) U.S. Cl. ........................ 420/99; 420/100; 420/101
(58) Field of Search ........................ 420/99, 100, 101

(56) References Cited

U.S. PATENT DOCUMENTS 5,256,213 A * 10/1993 Narai et al. ................ 148/320
5,960,250 A * 9/1999 Yasumoto et al. .......... 428/546

* cited by examiner

*Primary Examiner*—Daniel Jenkins
(74) *Attorney, Agent, or Firm*—DLA Piper Rudnick Gray Cary US LLP

(57) ABSTRACT

A long-life bearing steel for general purpose use is provided at low cost with no use of specific secondary refining process. Specifically, a bearing material having a component composition in which C: 0.95 to 1.10 mass %, Si: 0.15 to 0.70 mass %, Mn: 1.15 mass % or less, Cr: 0.90 to 1.60 mass %, and P: 0.025 mass % or less are contained, S and O, that are elements forming nonmetallic inclusions, are contained at S: 0.025 mass % or less and O: 0.0012 mass % or less, and the rest is composed of Fe and incidental impurities, wherein the maximum diameter of the oxide-based nonmetallic inclusion is more than 10 $\mu$m, but 15 $\mu$m or less in an inspection area: 320 mm$^2$, the number of oxide-based nonmetallic inclusions having an equivalent circle diameter of 3 $\mu$m or more is 250 or less in the inspection area: 320 mm$^2$, while in the material, AlN is contained at 0.020 mass % or less, and or the number of sulfide-based nonmetallic inclusions having a thickness of 1 $\mu$m or more is 1,200 or less in the inspection area: 320 mm$^2$.

11 Claims, 1 Drawing Sheet

BEARING MATERIAL

TECHNICAL FIELD

The present invention relates to a bearing material used for a rolling bearing, such as a roller bearing and a ball bearing, and, in particular, it relates to a bearing material having an excellent rolling contact fatigue life property.

BACKGROUND ART

Bearing materials used for rolling bearings, etc., are required to have long rolling contact fatigue lives. The $B_{10}$ life is used as one of evaluation methods of the rolling contact fatigue life. The $B_{10}$ life refers to the total number of loadings until cumulative failure probability is statistically assumed to reach 10%. In general, it is well known that the rolling contact fatigue life of the bearing is affected by hard oxide-based nonmetallic inclusions existing in the material. Therefore, hitherto, improvement of the rolling contact fatigue life has been intended by reducing the amount of oxygen in the material and, therefore, by achieving reduction of the amount of the oxide-based nonmetallic inclusions. At present, it has become possible to reduce the amount of oxygen in the material to 10 ppm or less on a weight ratio basis with the help of the advance of refining technology. However, the method for improving the rolling contact fatigue life by reduction of oxygen has nearly reached its limit. Furthermore, when the amount of oxygen is reduced to 10 ppm or less, the manufacturing cost is increased and, therefore, it is difficult to apply to steels for general purpose use.

Recently, suggestions intended for further improvement of the rolling contact fatigue life have been made. For example, in Japanese Unexamined Patent Application Publication No. 3-126839, a bearing material for realizing a long life by controlling the number of oxide-based nonmetallic inclusions in a unit area or unit volume has been disclosed. In Japanese Unexamined Patent Application Publication No. 5-25587, a bearing material for realizing a long life by controlling a predicted maximum diameter of the oxide-based nonmetallic inclusion estimated with statistics of extremes has been disclosed. However, regarding super clean steel in which the amount of oxygen has been reduced to nearly the limit value of 10 ppm, the relationship between the size and the number of the oxide-based nonmetallic inclusions is not completely clear.

Japanese Unexamined Patent Application Publication No. 9-291340 has focused attention on the thickness and the number of the sulfide-based nonmetallic inclusions in steel, and on the predicted maximum diameter of the oxide-based nonmetallic inclusion. The steel for bearings which has a long life by controlling the number of the sulfide-based nonmetallic inclusions having a thickness of 1 μm or more at 1,200 or less in an inspection area: 320 mm², and/or the predicted maximum diameter of the oxide-based nonmetallic inclusion at 10 μm or less in the inspection area: 320 mm² has been disclosed. However, regarding the technique disclosed in Japanese Unexamined Patent Application Publication No. 9-291340, the $B_{10}$ life of $5 \times 10^7$ or more has not been achieved with respect to the one in which the maximum diameter of the oxide-based nonmetallic inclusion is 10 μm or more. The aforementioned conventional technique is based on reduction of the number or the maximum diameter of the oxide to an extremely low value. In order to realize such super clean steel, a specific secondary refining process, such as ladle refining, is required. There are restrictions on the manufacturing process and the iron and steel maker which can carry out those in practice. Since the refining cost of steel is increased by a large degree, it is difficult to enlarge application to practical steels for general purpose use.

It is an object of the present invention to provide a long-life bearing material for general purpose use with no restriction on the refining process and no increase in the manufacturing cost.

DISCLOSURE OF INVENTION

The present invention was made for the aforementioned object. That is, the inventors of the present invention found out that regarding the steel in which the steel composition specified in the present invention and AlN and/or sulfide-based nonmetallic inclusions were controlled, a long-life bearing steel was able to be realized even when the predicted maximum diameter of the oxide-based nonmetallic inclusion exceeded 10 μm, as long as it was 15 μm or less, and the number thereof was controlled at a predetermined level or less and, therefore, the present invention was completed.

Specific items of the present invention will be described below.

That is, the present invention is a bearing material having a component composition in which C: 0.95 to 1.10 mass %, Si: 0.15 to 0.70 mass %, Mn: 1.15 mass % or less, Cr: 0.90 to 1.60 mass %, and P: 0.025 mass % or less are contained, S and O, that are elements forming nonmetallic inclusions, are contained at S: 0.025 mass % or less and O: 0.0012 mass % or less, and the rest is composed of Fe and incidental impurities, wherein in the material, AlN is contained at 0.020 mass % or less, and furthermore, the maximum diameter of the oxide-based nonmetallic inclusion is more than 10 μm, but 15 μm or less in an inspection area: 320 mm², while the number of oxide-based nonmetallic inclusions having an equivalent circle diameter of 3 μm or more is 250 or less in the inspection area: 320 mm².

The present invention is a bearing material having a component composition in which C: 0.95 to 1.10 mass %, Si: 0.15 to 0.70 mass %, Mn: 1.15 mass % or less, Cr: 0.90 to 1.60 mass %, and P: 0.025 mass % or less are contained, Mo: 0.10 to 0.25 mass % is further contained, S and O, that are elements forming nonmetallic inclusions, are contained at S: 0.025 mass % or less and O: 0.0012 mass % or less, and the rest is composed of Fe and incidental impurities, wherein in the material, AlN is contained at 0.020 mass % or less, and furthermore, the maximum diameter of the oxide-based nonmetallic inclusion is more than 10 μm, but 15 μm or less in an inspection area: 320 mm², while the number of oxide-based nonmetallic inclusions having an equivalent circle diameter of 3 μm or more is 250 or less in the inspection area: 320 mm².

The present invention is a bearing material having a component composition in which C: 0.95 to 1.10 mass %, Si: 0.15 to 0.70 mass %, Mn: 1.15 mass % or less, Cr: 0.90 to 1.60 mass %, and P: 0.025 mass % or less are contained, Sb: 0.0010 mass % or less is further contained, S and O, that are elements forming nonmetallic inclusions, are contained at S: 0.025 mass % or less and O: 0.0012 mass % or less, and the rest is composed of Fe and incidental impurities, wherein in the material, AlN is contained at 0.020 mass % or less, and furthermore, the maximum diameter of the oxide-based nonmetallic inclusion is more than 10 μm, but 15 μm or less in an inspection area: 320 mm², while the number of oxide-based nonmetallic inclusions having an equivalent circle diameter of 3 μm or more is 250 or less in the inspection area: 320 mm².

The present invention is a bearing material having a component composition in which C: 0.95 to 1.10 mass %, Si: 0.15 to 0.70 mass %, Mn: 1.15 mass % or less, Cr: 0.90 to 1.60 mass %, and P: 0.025 mass % or less are contained, Mo: 0.10 to 0.25 mass % and Sb: 0.0010 mass % or less are further contained, S and O, that are elements forming nonmetallic inclusions, are contained at S: 0.025 mass % or less and O: 0.0012 mass % or less, and the rest is composed of Fe and incidental impurities, wherein in the material, AlN is contained at 0.020 mass % or less, and furthermore, the maximum diameter of the oxide-based nonmetallic inclusion is more than 10 µm, but 15 µm or less in an inspection area: 320 mm$^2$, while the number of oxide-based nonmetallic inclusions having an equivalent circle diameter of 3 µm or more is 250 or less in the inspection area: 320 mm$^2$.

In the bearing material according to each of the aforementioned inventions, the number of sulfide-based nonmetallic inclusions having a thickness of 1 µm or more is preferably 1,200 or less in an inspection area: 320 mm$^2$.

Next, the present invention is a bearing material having a component composition in which C: 0.95 to 1.10 mass %, Si: 0.15 to 0.70 mass %, Mn: 1.15 mass % or less, Cr: 0.90 to 1.60 mass %, and P: 0.025 mass % or less are contained, S and O, that are elements forming nonmetallic inclusions, are contained at S: 0.025 mass % or less and O: 0.0012 mass % or less, and the rest is composed of Fe and incidental impurities, wherein in this material, the number of sulfide-based nonmetallic inclusions having a thickness of 1 µm or more is 1,200 or less in an inspection area: 320 mm$^2$, and furthermore, the maximum diameter of the oxide-based nonmetallic inclusion is more than 10 µm, but 15 µm or less in the inspection area: 320 mm$^2$, while the number of oxide-based nonmetallic inclusions having an equivalent circle diameter of 3 µm or more is 250 or less in the inspection area: 320 mm$^2$.

The present invention is a bearing material having a component composition in which C: 0.95 to 1.10 mass %, Si: 0.15 to 0.70 mass %, Mn: 1.15 mass % or less, Cr: 0.90 to 1.60 mass %, and P: 0.025 mass % or less are contained, S and O, that are elements forming nonmetallic inclusions, are contained at S: 0.025 mass % or less and O: 0.0012 mass % or less, Mo: 0.10 to 0.25 mass % is further contained, and the rest is composed of Fe and incidental impurities, wherein in the material, the number of sulfide-based nonmetallic inclusions having a thickness of 1 µm or more is 1,200 or less in an inspection area: 320 mm$^2$, and furthermore, the maximum diameter of the oxide-based nonmetallic inclusion is more than 10 µm, but 15 µm or less in the inspection area: 320 mm$^2$, while the number of oxide-based nonmetallic inclusions having an equivalent circle diameter of 3 µm or more is 250 or less in the inspection area: 320 mm$^2$.

The present invention is a bearing material having a component composition in which C: 0.95 to 1.10 mass %, Si: 0.15 to 0.70 mass %, Mn: 1.15 mass % or less, Cr: 0.90 to 1.60 mass %, and P: 0.025 mass % or less are contained, S and O, that are elements forming nonmetallic inclusions, are contained at S: 0.025 mass % or less and O: 0.0012 mass % or less, Sb: 0.0010 mass % or less is further contained, and the rest is composed of Fe and incidental impurities, wherein in the material, the number of sulfide-based nonmetallic inclusions having a thickness of 1 µm or more is 1,200 or less in an inspection area: 320 mm$^2$, and furthermore, the maximum diameter of the oxide-based nonmetallic inclusion is more than 10 µm, but 15 µm or less in the inspection area: 320 mm$^2$, while the number of oxide-based nonmetallic inclusions having an equivalent circle diameter of 3 µm or more is 250 or less in the inspection area: 320 mm$^2$.

The present invention is a bearing material having a component composition in which C: 0.95 to 1.10 mass %, Si: 0.15 to 0.70 mass %, Mn: 1.15 mass % or less, Cr: 0.90 to 1.60 mass %, and P: 0.025 mass % or less are contained, S and O, that are elements forming nonmetallic inclusions, are contained at S: 0.025 mass % or less and O: 0.0012 mass % or less, Mo: 0.10 to 0.25 mass % and Sb: 0.0010 mass % or less are further contained, and the rest is composed of Fe and incidental impurities, wherein in the material, the number of sulfide-based nonmetallic inclusions having a thickness of 1 µm or more is 1,200 or less in an inspection area: 320 mm$^2$, and furthermore, the maximum diameter of an oxide-based nonmetallic inclusion is more than 10 µm, but 15 µm or less in the inspection area: 320 mm$^2$, while the number of oxide-based nonmetallic inclusions having an equivalent circle diameter of 3 µm or more is 250 or less in the inspection area: 320 mm$^2$.

BEST MODE FOR CARRYING OUT THE INVENTION

Figure 1:
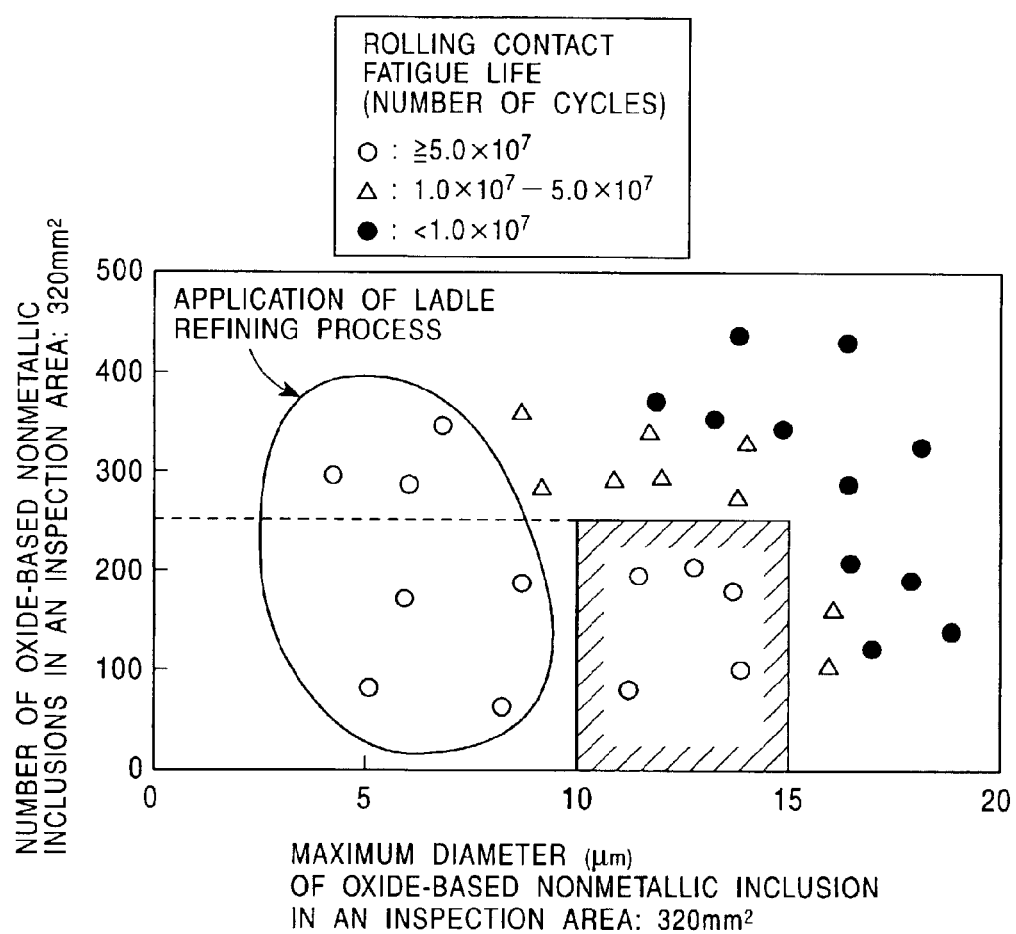
FIG. 1 is a graph showing the relationship of the maximum diameter of the oxide-based nonmetallic inclusion with the number of oxide-based nonmetallic inclusions having an equivalent circle diameter of 3 µm or more and the rolling contact fatigue life in an inspection area of 320 mm$^2$.

Reasons for the aforementioned limitations of the component composition of the bearing material according to the present invention will be described below in detail. The bearing material of the present invention has a component composition in which alloy designing has been performed based on JIS G4805 High carbon chromium bearing steels. Therefore, the bearing steel will be described below.

C: 0.95 to 1.10 mass %

C is an element which brings about a solid solution with a matrix and, therefore, effectively performs the function of reinforcing martensite, and is contained in order to ensure the strength after quenching and tempering and, thereby, to improve the rolling contact fatigue life. When the content thereof is less than 0.95 mass %, such an effect cannot be achieved. On the other hand, when it exceeds 1.10 mass %, since giant carbides are generated during casting and, therefore, workability and the rolling contact fatigue life are reduced, the content was limited within the range of 0.95 to 1.10 mass %.

Si: 0.15 to 0.70 mass %

Si is effective as an element which brings about a solid solution with a matrix, which increases the strength after quenching and tempering by an increase in temper softening resistance and, thereby, which improves the rolling contact fatigue life. The content of Si added for such purposes is specified to be within the range of 0.15 to 0.70 mass %.

Mn: 1.15 mass % or less

Mn improves toughness and hardness of the matrix martensite by improving the quenching property of the steel and, therefore, effectively performs the function of improving the rolling contact fatigue life. An addition of 1.15 mass % or less is adequate for such purposes. Although there is no need to specifically set the lower limit, an addition of 0.10 mass % or more is appropriate in order to deoxidize, and the like.

Cr: 0.90 to 1.60 mass %

Cr is a component which improves strength and improves abrasion resistance through improvement of the quenching property and formation of stable carbide and, by extension, which improves the rolling contact fatigue life. In order to achieve such effects, an addition of 0.90 to 1.60 mass % is necessary.

P: 0.025 mass % or less

Since P reduces the toughness and the rolling contact fatigue life of the steel, it is desirable that the content thereof is as low as possible, and the allowable upper limit is 0.025 mass %.

S: 0.025 mass % 0.025 mass % or less

S is bonded with Mn so as to form sulfide-based inclusions, for example, MnS, and therefore, improves machinability. However, when it is contained in high amounts, the rolling contact fatigue life is reduced and, therefore, the upper limit must be 0.025 mass %. However, as described later, in order to control the number of the inclusions at a predetermined amount by a general melting and rolling method, it is preferable that the upper limit is specified to be 0.003 mass %.

O: 0.0012 mass % or less

Since O forms hard oxide-based nonmetallic inclusions, and reduces the rolling contact fatigue life, it is desirable that the content is low, although the content up to 0.0012 mass % is allowable. Consequently, the upper limit thereof was specified to be 0.0012 mass %.

Mo: 0.10 to 0.25 mass %

In the present invention, Mo is added if necessary. However, since it is an expensive element, the addition is performed only when further improvement of quenching property is required. The addition of Mo within the range of 0.10 to 0.25 mass % is adequate for achieving the aforementioned effect.

Sb: 0.0010 mass % or less

Sb may be introduced from a material for manufacturing steel, for example, scrap. Since it is an element which reduces the rolling contact fatigue life, the upper limit thereof is desirably specified to be 0.0010 mass % by means of, for example, stringent selection of the scrap, etc.

Amount of AlN: 0.020 mass % or less

Since the rolling contact fatigue life is reduced remarkably when the amount of AlN exceeds 0.020 mass %, it is desirable that the amount is made to be as low as possible, while the upper limit is specified to be 0.020 mass %. As a method for reducing the amount of AlN in the steel, reduction of the amount of Al in the steel and the amount of N in the steel is most effective. Although handling is possible by increasing the keeping temperature during quenching, manufacturability of the bearing may be degraded remarkably. In order to satisfy the aforementioned amount of AlN, it is necessary that Al in the steel is specified to be 0.030 mass % or less, and preferably, be 0.020 mass % or less and, furthermore, N is specified to be 0.010 mass % or less, and preferably, be 0.008 mass % or less.

Another embodiment of the present invention is that the number of sulfide-based nonmetallic inclusions having a thickness of 1 $\mu$m or more is specified to be 1,200 or less when the inspection area is 320 mm$^2$. In the present invention, regarding the form of the sulfide-based nonmetallic inclusion, the reasons the thickness is limited to be 1 $\mu$m or more are that it is the limit of a size at which the composition of the nonmetallic inclusion can be visibly identified, and that there is good correspondence with the rolling contact fatigue life. It is desirable that the number of the sulfide-based nonmetallic inclusions is as small as possible with respect to improvement of the rolling contact fatigue life. Since the B$_{10}$ life is reduced rapidly when this number of the sulfide-based nonmetallic inclusions having a thickness of 1 $\mu$m or more exceeds 1,200 in the inspection area of 320 mm$^2$, the upper limit thereof is specified to be 1,200.

Next, reasons for the limitations of the maximum diameter and the number of the oxide-based nonmetallic inclusions, which are the most important specific items of the present invention, will be described.

Regarding JIS G4805 High carbon chromium bearing steels (SUJ2-equivalent steel) having the aforementioned component composition, the results of research on the steels, in which AlN and/or sulfide-based nonmetallic inclusions are controlled, will be described. FIG. 1 is a graph showing the relationship of the maximum diameter of the oxide-based nonmetallic inclusion with the number of oxide-based nonmetallic inclusions having an equivalent circle diameter of 3 $\mu$m or more and the relationship with the rolling contact fatigue life when the inspection area is 320 mm$^2$.

As is clear from FIG. 1, even when the maximum diameter of the oxide exceeds 10 $\mu$m, as long as it is 15 $\mu$m or less and the number of oxide-based nonmetallic inclusions of 3 $\mu$m or more is within the range of 250 or less, excellent rolling contact fatigue lives can be achieved. That is, a long-life steel can be attained without the need for reducing the maximum diameter of the oxide-based inclusion to an extremely small value such as 10 $\mu$m or less, as long as only the number thereof is controlled simultaneously. Therefore, since the long-life steel can be manufactured without any increase in refining cost and any process restriction, this range was adopted.

EXAMPLES

JIS G4805 High carbon chromium bearing steel type 2 (SUJ2-equivalent steel) having the chemical composition, amount of AlN, sulfide-based nonmetallic inclusions, and oxides shown in Table 1 was melted by a converter, RH degassing was performed and, thereafter, continuous casting was performed and rolling into a bar steel 65 mm in diameter was performed. For purposes of comparison, super clean steel subjected to ladle refining after melting with the converter was also melted. After normalizing and spheroidizing, oil quenching was performed after keeping at 830° C. for 30 min, tempering was performed at 180° C. for 2 h, cutting and lapping were performed and, therefore, a disk type test piece of 60 mm in diameter by 5 mm for a rolling contact fatigue life test was prepared. Regarding the measurement of the nonmetallic inclusions, a test piece having an inspection surface of 16 mm by 120 mm was taken from one quarter-diameter portion of the bar steel along the rolling direction, and the maximum diameter and the number of the oxide-based nonmetallic inclusions and the total number of the sulfide-based nonmetallic inclusions having a thickness of 1 $\mu$m or more were actually measured when the inspection area was 320 mm$^2$. The rolling contact fatigue life test was performed using a Mori thrust rolling contact fatigue tester under the condition of a Hertzian maximum contact stress: 5,260 MPa, a stress frequency: 30 Hz, and a lubricating oil: #68 turbine oil. The results of the tests were plotted onto probability paper on the assumption that the Weibull distribution was followed, and were evaluated as the B$_{10}$ life.

The aforementioned evaluation results are collectively shown in Table 1. As is clearly shown in this Table, every steel within the range of the present invention exhibits a life longer than that of the comparative steels.

Steel No. 7 is a comparative steel in which although the amount of AlN and sulfide-based inclusions are outside of the range of the present invention, oxides are controlled within the range of the present invention. It is clear that any remarkable effect of improving the rolling contact fatigue life is not recognized, and the effects of the present invention are achieved only after AlN and/or sulfide-based inclusions are controlled and, at the same time, the sizes and the numbers of oxides are controlled.

Steel Nos. 8 and 9 are comparative steels in which the maximum diameter or the number of the oxide-based inclusions exceeds the range specified in the present invention. It is clear that the rolling contact fatigue lives are reduced remarkably.

Steel No. 10 is a comparative steel in which the maximum diameter of the oxide-based inclusion is specified to be 10 μm or less by application of a ladle refining process. The life is certainly extended. However, the manufacturing cost is high, and there are restrictions on the manufacturing process and manufacturing maker. This is not suitable as the steel for general purpose use.

Industrial Applicability

As described above, the rolling contact fatigue life of the bearing material according to the present invention can be further improved regarding the steel in which the steel composition, and AlN and/or sulfide-based nonmetallic inclusions are controlled, even when the predicted maximum diameter of the oxide-based nonmetallic inclusion exceeds 10 μm, as long as it is 15 μm or less, and the number thereof is controlled at a predetermined number or less. Consequently, according to the present invention, the ladle refining, etc., which have been conventionally used for reducing the maximum diameter of the oxide-based nonmetallic inclusion, are not required. Since the manufacturing cost is controlled at a low level, and there is no restriction on the manufacturing process and manufacturing maker, the steel suitable for the long-life steel for general purpose use can be provided.

What is claimed is:

1. A bearing material having a component composition in which C: 0.95 to 1.10 mass %, Si: 0.15 to 0.70 mass %, Mn: 1.15 mass % or less, Cr: 0.90 to 1.60 mass %, and P: 0.025 mass % or less are contained, S and O, that are elements forming nonmetallic inclusions, are contained at S: 0.025 mass % or less and O: 0.0012 mass % or less, and the rest comprises Fe and incidental impurities, wherein in the material, AlN is contained at 0.020 mass % or less, and oxide-based nonmetallic inclusions are present with a maximum diameter of the oxide-based nonmetallic inclusions being more than 10 μm, but 15 μm or less in an inspection area: 320 mm$^2$, while the number of oxide-based nonmetallic inclusions having an equivalent circle diameter of 3 μm or more is 250 or less in the inspection area: 320 mm$^2$.

2. The bearing material according to claim 1 further comprising 0.10 to 0.25 mass % of Mo.

3. The bearing material according to claim 1 further comprising 0.0010 mass % or less of Sb.

4. The bearing material according to claim 1, wherein the number of sulfide-based nonmetallic inclusions having a thickness of 1 μm or more is 1,200 or less in the inspection area: 320 mm$^2$.

5. A bearing material having a component composition in which C: 0.95 to 1.10 mass %, Si: 0.15 to 0.70 mass %, Mn: 1.15 mass % or less, Cr: 0.90 to 1.60 mass %, and P: 0.025 mass % or less are contained, S and O, that are elements forming nonmetallic inclusions, are contained at S: 0.025 mass % or less and O: 0.0012 mass % or less, and the rest comprises Fe and incidental impurities, wherein in this material, the number of sulfide-based nonmetallic inclusions having a thickness of 1 μm or more is 1,200 or less in an inspection area: 320 mm$^2$, and oxide-based nonmetallic inclusions are present with a maximum diameter of the oxide-based nonmetallic inclusions being more than 10 μm, but 15 μm or less in the inspection area: 320 mm$^2$, while the number of oxide-based nonmetallic inclusions having an equivalent circle diameter of 3 μm or more is 250 or less in the inspection area: 320 mm$^2$.

TABLE 2

| Steel No. | Steel composition (mass %) | | | | | | | | Amount of AlN (mass %) | Number of sulfides (*1) | Maximum diameter of oxide (*2) (μm) | Number of oxides (*3) | $B_{10}$ life ×10$^6$ | Remarks |
| | C | Si | Mn | P | S | Cr | Mo | Sb | O | | | | | | |
| --- | --- | --- | --- | --- | --- | --- | --- | --- | --- | --- | --- | --- | --- | --- | --- |
| 1 | 0.98 | 0.26 | 0.39 | 0.014 | 0.004 | 1.42 | | | 0.0009 | 0.016 | 1085 | 12.1 | 204 | 64.2 | Invention example |
| 2 | 0.97 | 0.27 | 0.38 | 0.013 | 0.005 | 1.42 | 0.13 | | 0.0008 | 0.016 | 1090 | 11.9 | 210 | 56.0 | Invention example |
| 3 | 1.01 | 0.28 | 0.37 | 0.013 | 0.005 | 1.43 | | 0.004 | 0.0008 | 0.015 | 1121 | 13.8 | 170 | 72.8 | Invention example |
| 4 | 1.00 | 0.27 | 0.36 | 0.014 | 0.004 | 1.42 | | 0.003 | 0.0007 | 0.015 | 1260 | 11.5 | 168 | 53.0 | Invention example |
| 5 | 1.00 | 0.29 | 0.37 | 0.012 | 0.003 | 1.44 | | 0.005 | 0.0008 | 0.024 | 980 | 11.8 | 172 | 65.4 | Invention example |
| 6 | 0.99 | 0.27 | 0.39 | 0.012 | 0.004 | 1.45 | 0.14 | 0.002 | 0.0007 | 0.017 | 1043 | 10.9 | 220 | 55.8 | Invention example |
| 7 | 1.01 | 0.27 | 0.38 | 0.011 | 0.004 | 1.46 | | 0.003 | 0.0008 | 0.019 | 1325 | 13.2 | 234 | 23.2 | Comparative example |
| 8 | 0.97 | 0.26 | 0.41 | 0.014 | 0.005 | 1.46 | | 0.004 | 0.0008 | 0.017 | 1060 | <u>17.5</u> | 206 | 8.2 | Comparative example |
| 9 | 0.98 | 0.28 | 0.38 | 0.013 | 0.004 | 1.15 | | 0.003 | 0.0007 | 0.015 | 1040 | 11.7 | <u>280</u> | 14.3 | Comparative example |
| 10 | 1.03 | 0.29 | 0.41 | 0.012 | 0.006 | 1.47 | | 0.005 | 0.0008 | 0.014 | 1020 | 7.2 | 180 | 82.0 | Comparative example |

(*1) Number of sulfide-based nonmetallic inclusions having a thickness of 1 μm or more in an inspection area: 320 mm$^2$.
(*2) Maximum diameter of oxide-based nonmetallic inclusion in an inspection area: 320 mm$^2$.
(*3) Number of oxide-based nonmetallic inclusions having an equivalent circle diameter of 3 μm or more in an inspection area: 320 mm$^2$.

6. The bearing material according to claim 5 further comprising 0.10 to 0.25 mass % of Mo.

7. The bearing material according to claim 5 further comprising 0.0010 mass % or less of Sb.

8. The bearing material according to claim 2 further comprising 0.0010 mass % or less of Sb.

9. The bearing material according to claim 2, wherein the number of sulfide-based nonmetallic inclusions having a thickness of 1 μm or more is 1,200 or less in the inspection area: 320 mm².

10. The bearing material according to claim 3, wherein the number of sulfide-based nonmetallic inclusions having a thickness of 1 μm or more is 1,200 or less in the inspection area: 320 mm².

11. The bearing material according to claim 6 further comprising 0.0010 mass % or less of Sb.

* * * * *